No. 838,565. PATENTED DEC. 18, 1906.
J. F. McCANNA.
LUBRICATOR FOR AUTOMOBILE MOTORS, &c.
APPLICATION FILED JUNE 15, 1903.
2 SHEETS—SHEET 1.
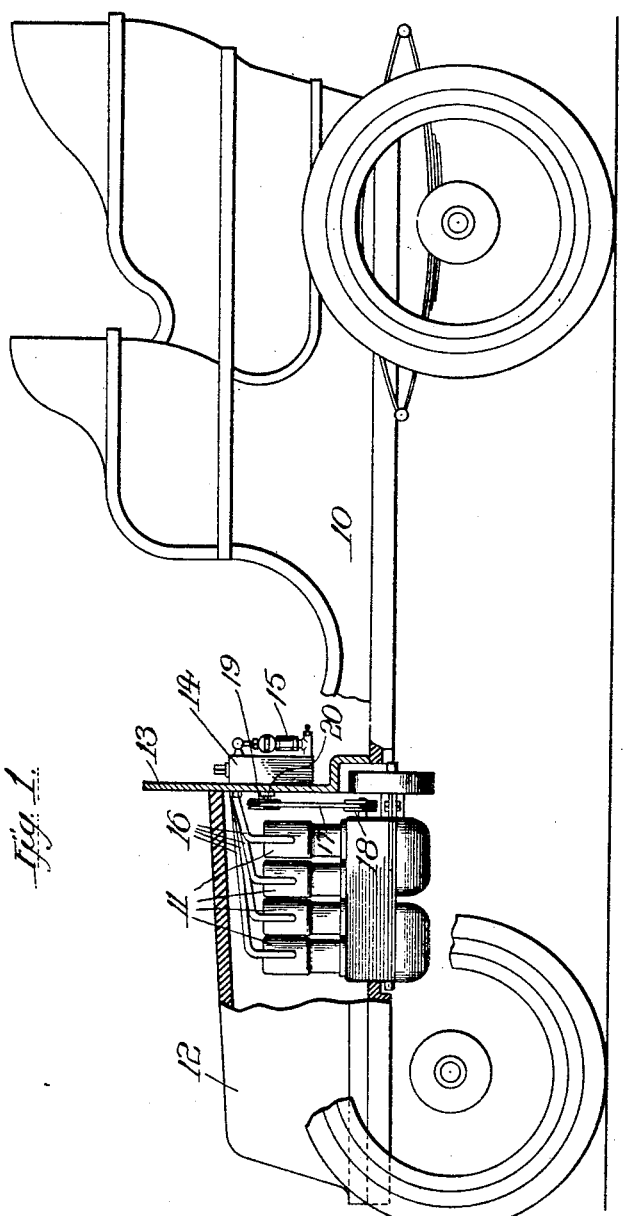

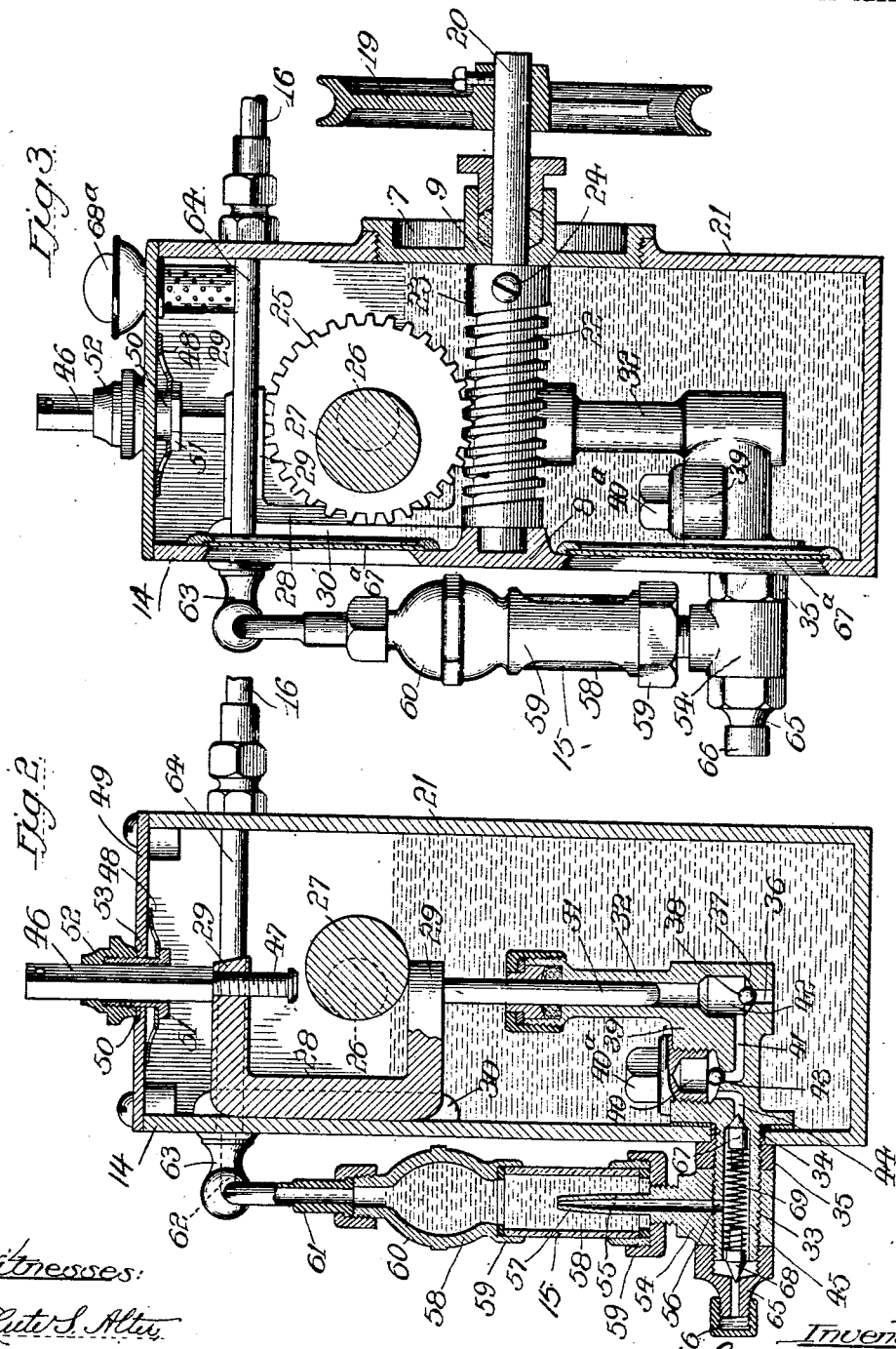

UNITED STATES PATENT OFFICE.

JOHN F. McCANNA, OF CHICAGO, ILLINOIS, ASSIGNOR TO THE JOHN F. McCANNA COMPANY, OF CHICAGO, ILLINOIS, A CORPORATION OF ILLINOIS.

LUBRICATOR FOR AUTOMOBILE-MOTORS, &c.

No. 838,565.          Specification of Letters Patent.          Patented Dec. 18, 1906.

Application filed June 15, 1903. Serial No. 161,457.

*To all whom it may concern:*

Be it known that I, JOHN F. McCANNA, a citizen of the United States, residing at Chicago, in the county of Cook and State of Illinois, have invented certain new and useful Improvements in Lubricators for Automobile-Motors, &c., of which the following is a specification.

This invention relates to improvements in lubricators, and is particularly adapted to the lubrication of automobiles or other vehicles, although it is not restricted in its use to this purpose.

The invention consists of the combinations and arrangements of parts hereinafter described and then pointed out in the appended claims.

In the drawings illustrating the invention, Figure 1 is a side elevation of an automobile in outline having the hood partially broken away in order to show the motors for driving the same and showing my invention applied thereto. Fig. 2 is a vertical transverse section of the reservoir and lubricating-pumps, and Fig. 3 is a similar section taken through another portion of the apparatus.

Referring to Fig. 1, 10 indicates in outline an ordinary automobile having an engine or engines 11 for driving the same located at the forward part of the automobile and under the hood 12. Fig. 1 shows an automobile and its driving-motors of one description; but it is to be understood that my invention is equally applicable to other types of automobiles, as well as other machines, and that to adapt the same thereto a slight rearrangement of the various feed-pipes and the driving connections for the lubricator pump or pumps only is required.

Located on the rear face of the dash 13 of the automobile is the lubricating apparatus or pump 14, provided with sight-feeds 15, so located as to be within the range of vision of the chauffeur or operator. The particular construction of the pumping mechanism will be hereinafter more fully described. Leading from the pumps contained in the reservoir 14 are pipes or conduits 16, which conduct the oil to the cylinders of the motors 11 or other parts to be lubricated. Motion for driving the pump may be attained through the medium of a belt 17 or chain running over a wheel 18 on the engine-shaft and driving a band or sprocket wheel 19, fixed to a shaft 20, hereinafter referred to, and employed to drive the pumping mechanism.

The lubricant reservoir or cup 21 has journaled, as at 8 and 9, in the rear and front walls thereof in Fig. 3 the shaft 20, hereinbefore referred to. This shaft is provided with a worm 22, which for convenience in assembling the parts may be formed on a removable sleeve 23, secured to the shaft 20 inside the reservoir 21 by a set-screw 24, and the bearing 9 is preferably provided in a screw-cap 7, closing an aperture in the wall of the reservoir opposite the bearing 8, so as to permit of the ready removal of the shaft 20 and worm-sleeve 23 from the reservoir. Meshing with the worm 22 is a pinion 25 on a shaft 26, provided with eccentric 27, the said shaft 26 being journaled in the ends (not shown) of the tank 21.

It is to be understood that the number of pumps employed depends upon the number of bearings to be lubricated, and although I have shown but one such pump it will be understood that the description thereof will apply to the additional pumps for feeding oil to the other cylinders of the engines 11 or other bearings.

Located in the reservoir 21 is a yoke 28, arranged with the arms 29 thereof extending horizontally and guided in its reciprocatory movement by vertical flanges 30, secured to one wall of the reservoir when motion is imparted thereto by the eccentric rotating between the arms thereof.

The lower arm of the yoke 28 is provided with a plunger 31, reciprocating in a barrel 32, provided with a horizontal extension 33, which passes through an aperture 34 and projects from the reservoir 21. This extension 33 is screw-threaded, and a nut 35 is employed for clamping the pump to the wall of the reservoir. The bottom of the barrel 32 has an opening 36 and is formed with a seat 37, on which rests a ball or other valve 38 to close the opening 36 when the pump is on its discharge-stroke. The bottom of the barrel 32 is also provided with an enlargement or offset 39, apertured from the top to provide a cavity 40, into which leads a duct 41 from a chamber 42 in the pump-barrel above the valve 38, the cavity being closed by a screw-cap 40ᵃ. The mouth of the duct 41 discharges into the cavity 40 and is closed by a valve 43 on the upward stroke of the plunger 31 to prevent oil discharged from the pump on the preceding stroke from being sucked back into the barrel 32. Leading from the cavity 40 is a duct 44, which discharges into a passage 45 in the extension 33.

Encircling the extension 33 beyond the nut 35 is a sleeve 54, which is provided with a vertical passage 55, communicating with an aperture 56 in the extension 33 and terminating in a nozzle 57, entering the bottom of a sight-feed glass 58, seated in a casing 59 and communicating with the bulb 60, formed on the upper part of the casing 59. The outlet of the bulb 60 is through a connection 61, entering a bracket 63, secured to one wall of the reservoir 21 and provided with a horizontal passage 62, (shown in dotted lines in Fig. 2,) registering with a tube 64, extending through the opposite wall of the reservoir 21 and having connected thereto one of the pipes 16 shown in Fig. 1. The sight-feed glass 58 is designed to be charged with water and is filled by means of a suitable charger, which is adapted to be screwed onto a nipple 65, threaded onto the outer end of the extension 33 and normally closed by a cap 66. The end of the passage 45 communicating with the duct 44 is normally closed by a spring-pressed valve 67 to prevent ingress of water to the pump when the sight-feed glass 58 is being charged, and to prevent escape of oil through the passage of the nipple 65 a similar valve 68 closes such passage, which latter is practically a continuation of the passage in the extension 33. Preferably the valves 67 and 68 are held to their seats by an expansion-spring 69, located between and reacting against the same. The charger should be of such capacity as to just fill the gage-glass and bulb 60, or it may be graduated in order to determine when the proper quantity of water has been forced into the glass, and is adapted to be screwed upon the threaded end of the nipple 65 or attached thereto in any other preferred manner.

The top of the reservoir is closed by a cap 49, secured in place by screws, as shown, and passing through the said cap is a rod 46, having a screw-threaded lower end 47, passing through an internally-threaded aperture in the upper arm of the yoke 28 and projecting in such manner as to be in the path of the eccentric 27. When the pump is working so as to effect a maximum discharge, the threaded extension 47 of the rod 46 is so adjusted that the eccentric will freely rotate between the end of the extension 47 and the lower leg 29 of the yoke 28, but all lost play being eliminated.

If it be desired to shorten the stroke of the pump and decrease the rate at which oil is discharged, the rod 46 may be screwed upwardly, thereby providing lost motion, which may be varied at will, and by unscrewing the rod to the limit of its movement the pump may be arrested.

The rod 46 is held against accidental rotation by means of a spring-washer 48, which engages the under face of the top plate 49 of the tank and is held in frictional engagement therewith by a shoulder 51 on an externally-threaded sleeve 50, extending through the cap 49 and engaged by an internally-threaded nut 52, surrounding the rod 46 and provided with a polygonal aperture of the same shape as the rod. The lower face of the nut 52 is serrated or roughened, as at 53, and bites into the top of the tank when screwed up to adjust the tension of the spring-washer 48. The tension of the spring-washer is sufficient to prevent accidental turning of the rod 46, but permits the said rod to be turned by a key or other suitable device.

In the operation of the pump and during the running of the automobile a continuous motion is imparted to the worm 22, and through the medium of the pinion 25, shaft 26, eccentric 27, and the yoke 28 the plunger 31 is reciprocated, drawing a charge of oil into the chamber 42 on the upstroke thereof. During this action the valve 43 will be closed by back pressure. On the downstroke of the plunger the valve 38 will be forced to its seat and the valve 43 lifted, the oil being forced past the valve 67 through the extension 33 and out through the nozzle 57. The oil will leave the nipple in drops and being of lower specific gravity than the water in the glass 58 will rise therein, and as the pump continues to operate it will be forced through the tube 62 and pipe 64 to its feed-pipe 16. By this arrangement the chauffeur or other attendant will be enabled to readily observe the rate at which the oil is being supplied to the cylinders. When the motor is not operating and it is desired to lubricate the bearings preliminarily, the rod 46 may be screwed upwardly, and by attaching a suitable tool or handle to said rod 46 the plunger may be reciprocated by hand.

The reservoir may be provided with apertures closed by glasses, as at 67ᵃ, to enable the operator to see at a glance the quantity of oil in the reservoir, and the cap 49 has a filling-aperture closed by a screw-plug 68ᵃ and a strainer located under the aperture, as shown in Fig. 3.

The pump mechanism being located entirely within the tank and submerged in the oil its operative parts are well lubricated, and adjustment to vary the rate of delivery of the same may be effected without removing the cap or cover of the tank.

I do not herein claim, broadly, the adjusting means extending from the outside into the reservoir for adjusting the throw of the pump, as the same is claimed in an application filed by me December 1, 1905, Serial No. 289,861, as a division of an application filed by me, Serial No. 161,458, June 15, 1903.

Having described my invention, what I claim is—

1. In a device of the class described, the combination of a reservoir, a pump therein having a reciprocating piston, a sight-feed device, a tube communicating with the pump and discharging between its ends into the sight-feed device, and a pair of oppositely-acting spring-pressed valves for closing the ends of the tube and located at the opposite sides of the point of discharge of the tube, the outer end of the said tube being designed to have connected thereto a suitable device for charging the sight-feed device with water.

2. In a device of the class described, the combination of a reservoir, a pump therein having a reciprocating piston and a threaded extension projecting through the wall of the reservoir, a sight-feed device, a tube extending into the sight-feed device, the extension having an opening between its ends registering with the passage of the tube, spring-pressed valves in the extension at opposite sides of the said opening, and a nipple upon the outer end of the extension adapted to have connected thereto a device for charging the sight-feed device with water.

3. In a device of the class described, the combination of a reservoir, a pump therein, means for operating the pump, an extension projecting through the wall of the reservoir and having a passage communicating with the pump, a valve closing each end of the passage, and a sight-feed glass in communication with the passage between the valves, and a nipple upon the outer end of the extension adapted to have connected thereto a device for charging the sight-feed device with water.

4. In a device of the class described, the combination of a reservoir, a pump therein, means for operating the pump, an extension projecting through the wall of the reservoir and having a passage communicating with the pump, a valve closing each end of the passage, an expansion-spring located between and reacting against the valves, a sight-feed and a passage leading from between the valves to the sight-feed, the outer end of the extension being designed to have connected thereto a device for charging the sight-feed with water.

5. In a device of the class described, the combination of a lubricating-pump having an extension provided with a passage, a valve closing each end of the passage, an expansion-spring located between and reacting against the valves, a sight-feed glass designed to contain water and open to communication with the extension-passage between the valves thereof, the said extension being designed to have connected thereto a device for charging the sight-feed with water.

6. In a lubricator for automobiles having the motor located in front of the dash thereof, a reservoir mounted on the rear of the dash, a pump within the reservoir, a shaft for driving the pump and projecting through the dash, driving connections between the motor and shaft, a sight-feed device carried by the reservoir on its side opposite the dash, an oil-conductor leading from the pump to the sight-feed, and an oil connection leading from the sight-feed to the motor.

7. In a lubricator, the combination with a reservoir, of a pump located therein, a yoke connected to the pump-plunger, a guide for the yoke within the reservoir, an eccentric for reciprocating the yoke, and means passing into the reservoir and coöperating with the yoke to regulate the stroke of the pump-plunger.

8. In a lubricator, the combination with a reservoir, of a pump located therein, a yoke fixed to the pump-plunger, a vertical flange on and within the reservoir by which the yoke is guided, an eccentric for reciprocating the yoke, and an adjustable rod extending into the reservoir and coöperating with the yoke to regulate the stroke of the pump-plunger.

9. In a lubricator, the combination with a reservoir having an aperture in one of its walls, of a pump located in the reservoir, a shaft provided with an eccentric for reciprocating the pump-plunger and having a pinion fixed thereto, a removable cap closing the said aperture, a shaft journaled on the cap and having a worm engaging the pinion, and a driving connection for the worm-shaft.

In testimony whereof I affix my signature in presence of two witnesses.

JOHN F. McCANNA.

Witnesses:
　ARTHUR B. SEIBOLD,
　E. MOLITOR.